(12) United States Patent
Wu et al.

(10) Patent No.: US 8,477,853 B2
(45) Date of Patent: Jul. 2, 2013

(54) METHOD AND APPARATUS FOR ENCODING AND/OR DECODING BIT DEPTH SCALABLE VIDEO DATA USING ADAPTIVE ENHANCEMENT LAYER PREDICTION

(75) Inventors: Yu Wen Wu, Beijing (CN); Yong Ying Gao, Beijing (CN)

(73) Assignee: Thomson Licensing, Boulogne-Billancourt (FR)

( * ) Notice: Subject to any disclaimer, the term of this patent is extended or adjusted under 35 U.S.C. 154(b) by 441 days.

(21) Appl. No.: 12/448,153

(22) PCT Filed: Dec. 14, 2006

(86) PCT No.: PCT/CN2006/003414
§ 371 (c)(1),
(2), (4) Date: Jun. 10, 2009

(87) PCT Pub. No.: WO2008/071036
PCT Pub. Date: Jun. 19, 2008

(65) Prior Publication Data
US 2010/0111167 A1    May 6, 2010

(51) Int. Cl.
*H04N 7/18* (2006.01)
(52) U.S. Cl.
USPC .......................... 375/240.26; 375/240.25
(58) Field of Classification Search
USPC .................................. 375/240.01–240.29
See application file for complete search history.

(56) References Cited

U.S. PATENT DOCUMENTS

| 2005/0259729 | A1* | 11/2005 | Sun ........................... 375/240.1 |
| 2006/0083308 | A1 | 4/2006 | Schwarz et al. |
| 2006/0083309 | A1 | 4/2006 | Schwarz et al. |
| 2006/0133503 | A1* | 6/2006 | Park et al. ................. 375/240.16 |
| 2006/0233250 | A1* | 10/2006 | Cha et al. .................. 375/240.12 |
| 2007/0014349 | A1* | 1/2007 | Bao et al. ................... 375/240.1 |
| 2009/0129468 | A1* | 5/2009 | Park et al. ................. 375/240.13 |

FOREIGN PATENT DOCUMENTS

| EP | 1715693 | 10/2006 |
| EP | 1727372 | 11/2006 |
| EP | 1871113 | 12/2007 |
| JP | 2007266750 | 10/2007 |
| WO | WO 2006/026842 | 3/2006 |
| WO | W02006059848 | 6/2006 |

OTHER PUBLICATIONS

Search Report Dated Aug. 16, 2007.

(Continued)

*Primary Examiner* — Andy Rao
(74) *Attorney, Agent, or Firm* — Tutunjian & Bitetto, P.C.

(57) ABSTRACT

A scalable video bitstream may have an H.264/AVC compatible base layer (BL) and a scalable enhancement layer (EL), where scalability refers to color bit depth. The SVC standard allows spatial inter-layer prediction, wherein a residual in the EL is generated which is then intra coded. Another spatial intra-coding mode for EL is pure intra coding (I_NxN). The invention discloses a new intra-coding mode and two new inter coding modes, particularly for bit depth scalability. The new intra coding mode uses encoding of the residual between upsampled reconstructed BL and original EL, using mode selection. Two possible modes are residual prediction from BL and additional intra-coding of this residual. The new inter coding modes use also prediction of EL from reconstructed BL. In a first inter coding mode, the residual is encoded using Motion Estimation based on this residual. In a second inter coding mode, the residual is encoded using upsampled motion information from the BL.

6 Claims, 5 Drawing Sheets

OTHER PUBLICATIONS

Gao, Yonying et al., "Applications and Requirement for Color Bit Depth Scalability", Joint Video Team (JVT) of ISO/IEC MPEG & ITU-T VCEG (ISO/IEC JTC1/SC29/WG11 and ITU-T SG16 Q.6), 21st Meeting, Hangzhou, China Oct. 20-27, 2006.

Segall, Andrew et al., "New Results with the Tone Mapping SEI Message", Joint Video Team (JVT) of ISO/IEC MPEG & ITU-T VCEG (ISO/IEC JTC1/SC29/WG11 and ITU-T SG16 Q.6), 21st Meeting, Hangzhou, China Oct. 20-27, 2006.

Segall, Andrew, "SVC-to-AVC Bit-stream Rewriting for Coarse Grain Scalability", Joint Video Team (JVT) of ISO/IEC MPEG & ITU-T VCEG (ISO/IEC JTC1/SC29/WG11 and ITU-T SG16 Q.6), 20th Meeting, Klagenfurt, Austria Jul. 15-21, 2006.

Segall, Andrew, et al., "Tone Mapping SEI Message", Joint Video Team (JVT) of ISO/IEC MPEG & ITU-T VCEG (ISO/IEC JTC1/SC29/WG11 and ITU-T SG16 Q.6), 19th Meeting, Geneva, Switzerland Apr. 1-10, 2006.

\* cited by examiner

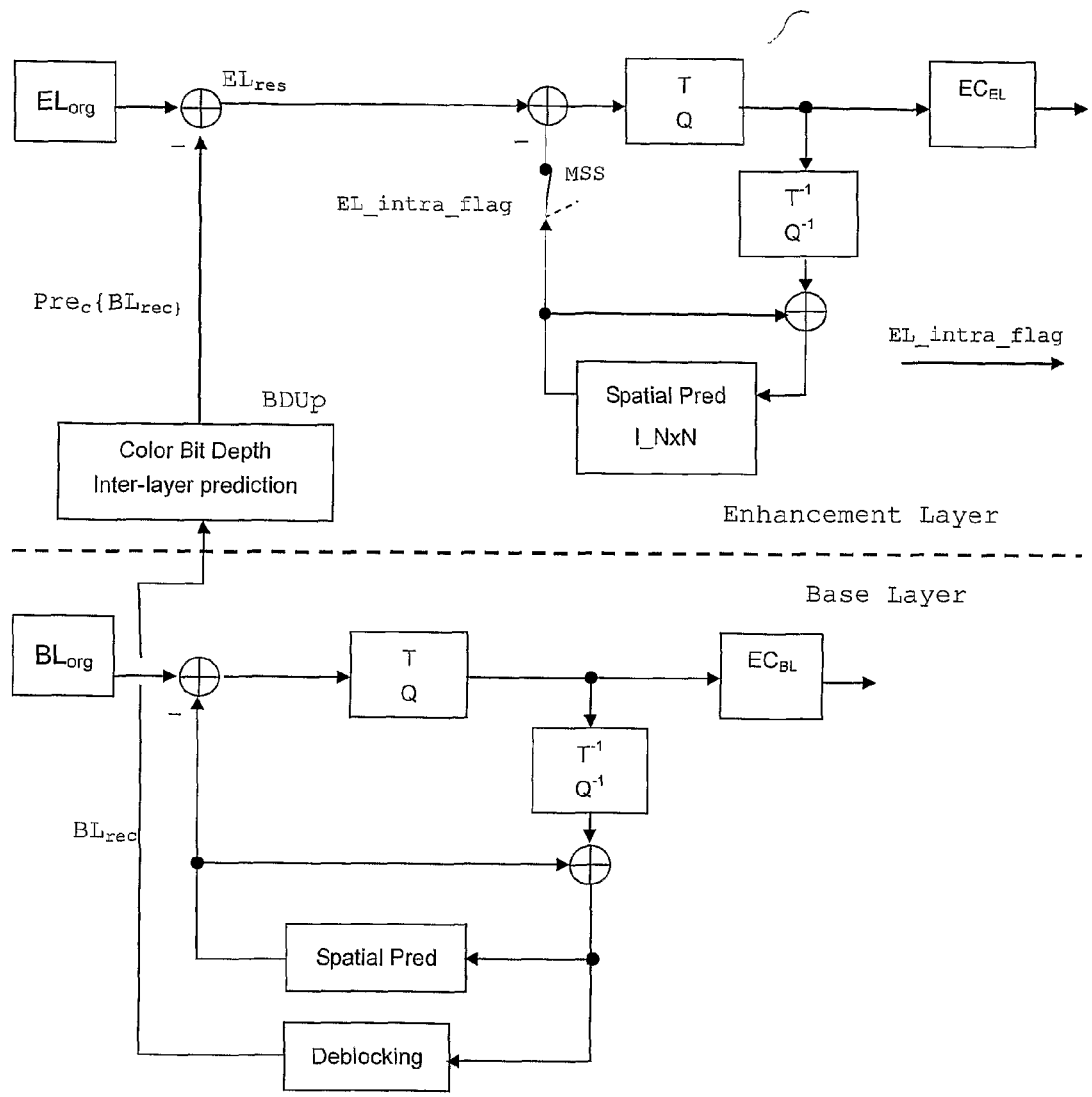
Fig.2 (Intra-encoder)

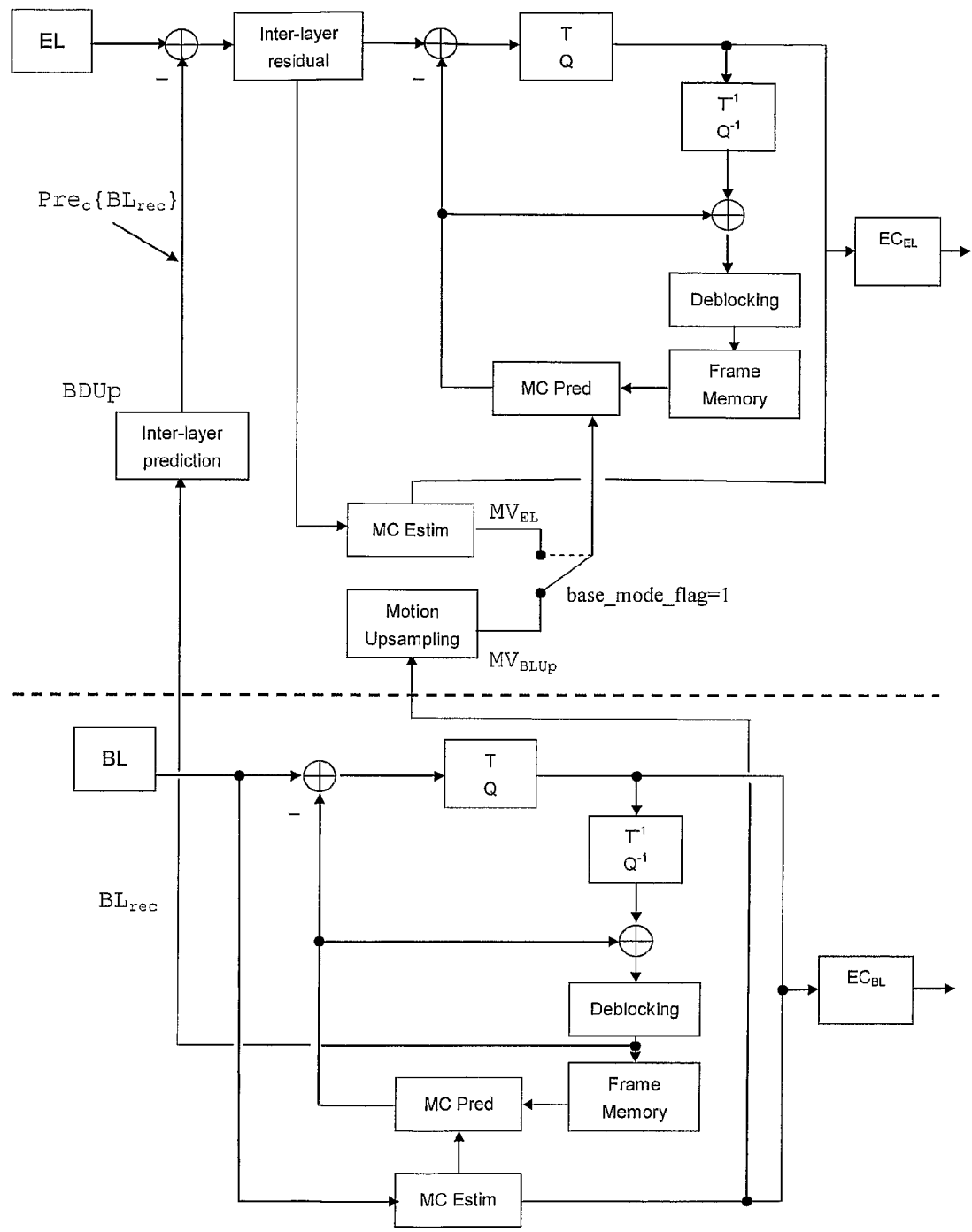
Fig.3 (Inter-encoder)

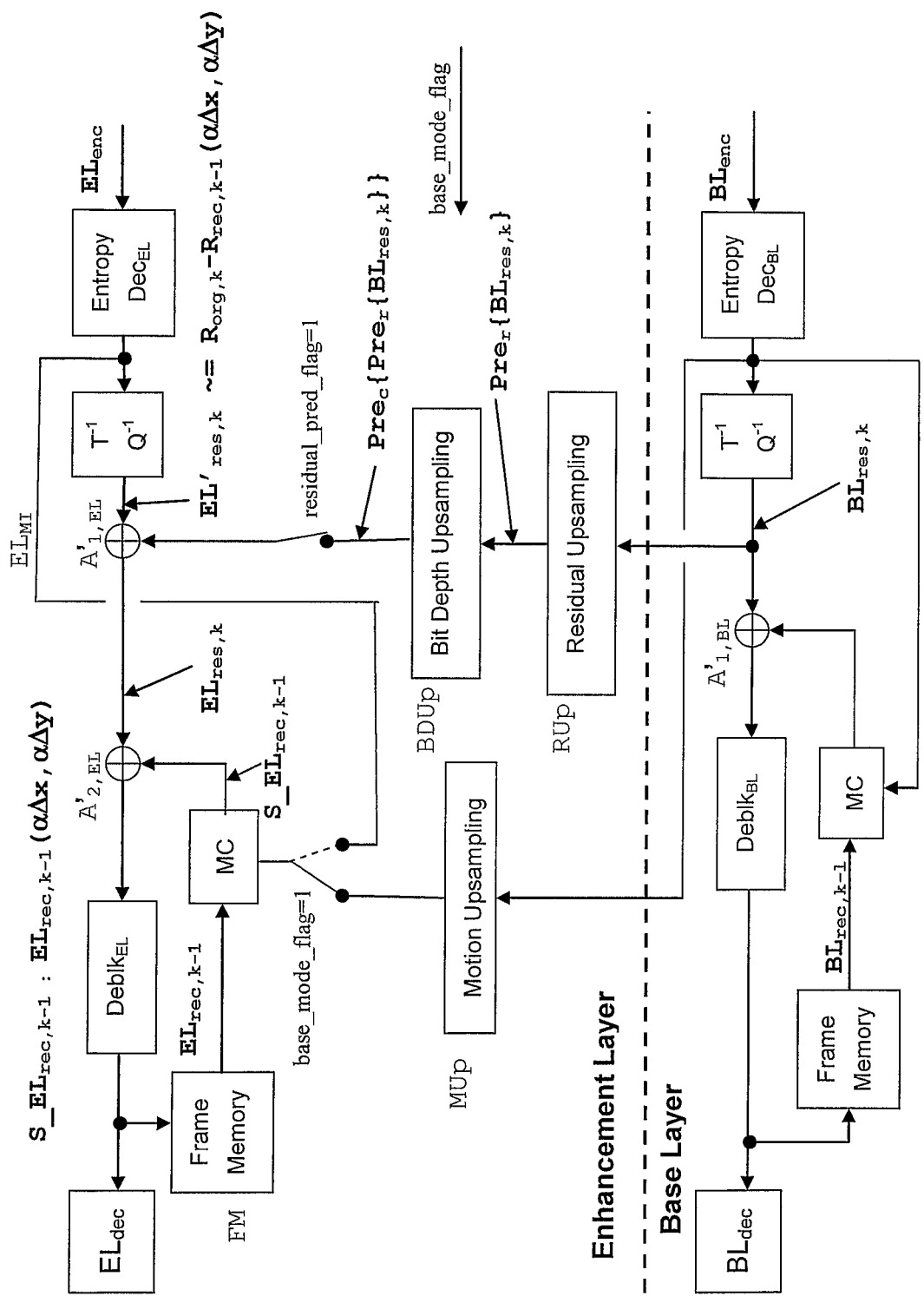
Fig. 4 (Inter-decoder)

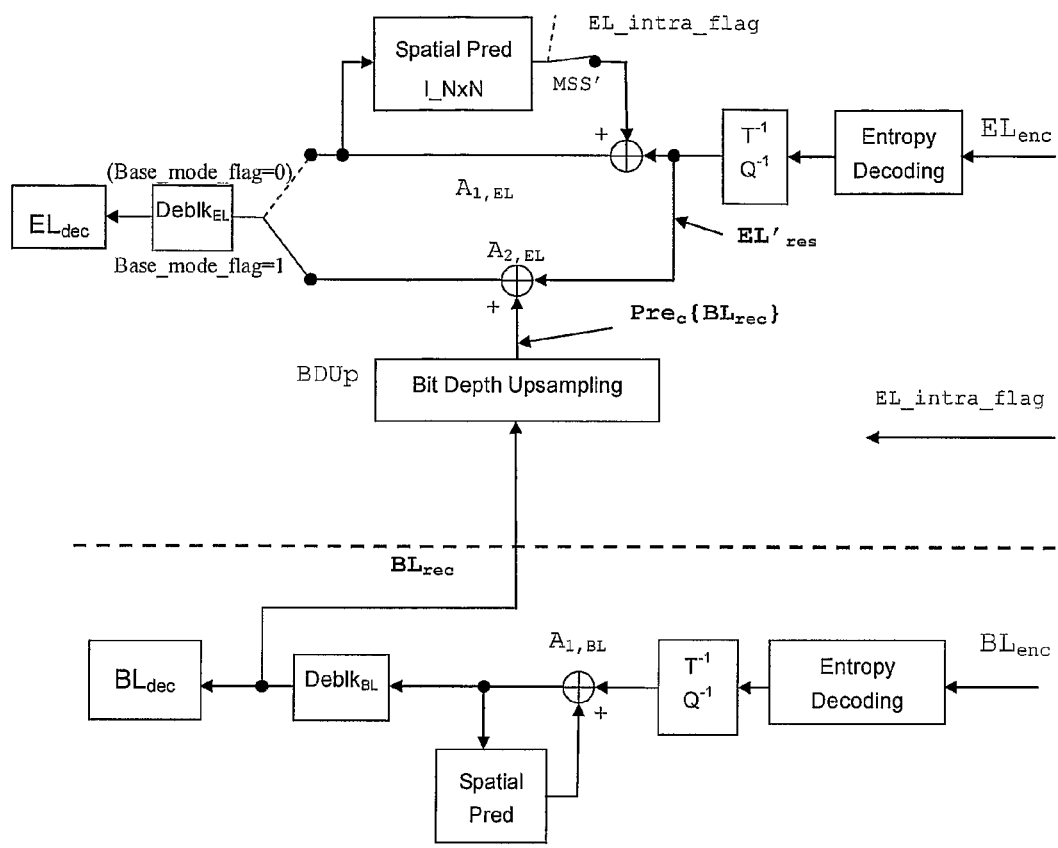
Fig.5 (Intra-decoder)

METHOD AND APPARATUS FOR ENCODING AND/OR DECODING BIT DEPTH SCALABLE VIDEO DATA USING ADAPTIVE ENHANCEMENT LAYER PREDICTION

This application claims the benefit, under 35 U.S.C. §365 of International Application PCT/CN2006/003414, filed Dec. 14, 2006, which was published in accordance with PCT Article 21(2) on Jun. 19, 2008 in English.

FIELD OF THE INVENTION

The invention relates to the technical field of digital video coding. It presents a coding solution for a novel type of scalability: bit depth scalability.

BACKGROUND

The video coding standard H.264/AVC provides various video coding modes and dynamic selection between them according to rate-distortion optimization (RDO). Its extension for Scalable Video Coding (SVC) provides different layers and supports for spatial scalability either direct encoding of the enhancement layer (EL), or inter-layer prediction. In direct encoding of the EL, a mode called I_N×N, redundancy between layers is not used: the EL is purely intra coded.

Inter-layer prediction is used in two coding modes, namely I_BL if the base layer (BL) is intra-coded, and residual prediction if the BL is inter-coded, so that EL and EL residuals are generated. With residual prediction, an EL residual is predicted from the EL residual.

For intra-coded EL macroblocks (MBs), the SVC supports two types of coding modes, namely original H.264/AVC I_N×N coding (spatial prediction, base_mode_flag=0) and I_BL, a special SVC coding mode for scalability where an EL MB is predicted from a collocated BL MB.

For inter-coding, the first step is generating BL and EL differential images called residuals. Residual inter-layer prediction is done for encoding the difference between the BL residual and the EL residual.

In recent years, higher color depth than the conventional eight bit color depth is more and more desirable in many fields, such as scientific imaging, digital cinema, high-quality-video-enabled computer games and professional studio and home theatre related applications. Accordingly, the state-of-the-art video coding standard H.264/AVC has included Fidelity Range Extensions (FRExt), which support up to 14 bits per sample and up to 4:4:4 chroma sampling.

For a scenario with two different decoders, or clients with different requests for the bit depth, e.g. 8 bit and 12 bit for the same raw video, the existing H.264/AVC solution is to encode the 12-bit raw video to generate a first bit-stream, and then convert the 12-bit raw video to an 8-bit raw video and encode it to generate a second bitstream. If the video shall be delivered to different clients who request different bit depths, it has to be delivered twice, e.g. the two bitstreams are put in one disk together. This is of low efficiency regarding both the compression ratio and the operational complexity.

The European Patent application EP06291041 discloses a scalable solution to encode the whole 12-bit raw video once to generate one bitstream that contains an H.264/AVC compatible BL and a scalable EL. Due to redundancy reduction, the overhead of the whole scalable bitstream on the above-mentioned first bitstream is small compared to the additional second bitstream. If an H.264/AVC decoder is available at the receiving end, only the BL sub-bitstream is decoded, and the decoded 8-bit video can be viewed on a conventional 8-bit display device; if a bit depth scalable decoder is available at the receiving end, both the BL and the EL sub-bitstreams may be decoded to obtain the 12-bit video, and it can be viewed on a high quality display device that supports color depths of more than eight bit.

SUMMARY OF THE INVENTION

The above-mentioned possibilities for redundancy reduction are not very flexible, considering that the efficiency of a particular encoding mode depends on the contents of the image. Different encoding modes may be optimized for different sequences. The efficiency of an encoding mode is higher if more redundancy can be reduced and the resulting bit-stream is smaller. The present invention provides a solution for this problem in the context of bit depth scalability.

Claim 1 discloses a method for encoding scalable video data that allows improved redundancy reduction and dynamic adaptive selection of the most efficient encoding mode. Claim 4 discloses a corresponding decoding method.

A corresponding apparatus for encoding is disclosed in claim 8, and a corresponding apparatus for decoding is disclosed in claim 9.

Three new SVC compatible coding modes of EL for CBDS are disclosed: one for intra coding and two for inter coding. It has been found that coding the inter-layer residual directly is more effective for bit depth scalable coding.

The new intra coding mode uses encoding of the residual between upsampled reconstructed BL and original EL ($EL_{org}$-$BL_{rec,up}$), wherein mode selection is used. In principle, the inter-layer residual is treated as N-bit video to replace the original N-bit EL video. Two possible modes are
1. a residual predicted from BL is just transformed, quantized and entropy coded, and
2. this residual is additionally intra-coded (I_N×N).

Conventionally, the best mode for Intra MB was selected between I_BL mode and I_N×N mode of original EL N-bit video, using RDO. With the presented new Intra mode, the Intra MB best mode is selected between I_BL mode and I_N×N of N-bit inter-layer residual.

The new inter coding modes use prediction of EL from upsampled reconstructed BL (like the new intra mode) instead of the BL residual. Two possible inter coding modes (switched by a flag) are
1. the residual ($EL_{org}$-$BL_{rec,up}$) is encoded using Motion Estimation based on this residual; and
2. the residual ($EL_{org}$-$BL_{rec,up}$) is encoded using motion information from the BL, thereby omitting Motion Estimation on the EL.

According to the invention, reconstructed BL information units (instead of original BL information units or BL residuals) are upsampled using bit depth upsampling, and the upsampled reconstructed BL information units are used to predict the collocated EL information units. This has the advantage that the prediction in the encoder is based on the same data that are available at the decoder. Thus, the differential information or residual that is generated in the encoder matches better the difference between the bit-depth upsampled decoded BL image at the decoder and the original EL image, and therefore the reconstructed EL image at the decoder comes closer to the original EL image.

Information units may be of any granularity, e.g. units of single pixels, pixel blocks, MBs or groups thereof. Bit depth upsampling is a process that increases the number of values that each pixel can have. The value corresponds usually to the color intensity of the pixel. Thus, fine tuned color reproduction possibilities are enhanced, and gradual color differences of the original scene can be better encoded and decoded for being reproduced. Advantageously the video data rate can be reduced compared to current encoding methods.

An encoder generates a residual from the original EL video data and bit depth upsampled reconstructed EL data, and the residual is entropy encoded and transmitted. The reconstructed BL information is upsampled at the encoder side and in the same manner at the decoder side, wherein the upsampling refers at least to bit depth.

Further, the upsampling can be performed for intra coded as well as for inter coded images or MBs. However, different modes can be used for intra and inter coded images. Other than Intra coded images or I-frames, Inter coded images, also called P- or B-frames, need for their reconstruction other images, i.e. images with other picture order count (POC).

According to one aspect of the invention, an encoder can select between at least two different intra coding modes for the EL: a first intra coding mode comprises generating a residual between the upsampled reconstructed BL and the original EL, and a second intra coding mode additionally comprises intra coding of this residual. In principle, the inter-layer residual is treated as higher bit depth video in the EL branch, replacing the conventional higher bit depth video. The residual or its intra coded version is then transformed, quantized and entropy coded. Conventionally, the best mode for intra MBs is selected between I_BL mode and I_NxN mode of original EL video, using RDO. With the disclosed new intra mode, the best intra MB mode is selected between I_BL mode and I_NxN of the high bit depth inter-layer residual, using RDO.

According to another aspect of the invention, the encoder can employ an Inter coding mode that comprises generating a residual between the bit depth upsampled reconstructed BL and the original EL. Further, the encoder may select for the EL between motion vectors that are upsampled from the BL and motion vectors that are generated based on said residual between the upsampled reconstructed BL and the original EL. Selection may be based on RDO of the encoded EL data.

According to one aspect of the invention, a method for encoding video data having a BL and an EL, wherein pixels of the BL have less bit depth than pixels of the enhancement layer, comprises steps of
transforming and quantizing BL data,
inverse transforming and inverse quantizing the transformed and quantized BL data, wherein reconstructed BL data are obtained,
upsampling the reconstructed BL data, wherein the upsampling refers at least to bit depth and wherein a predicted version of EL data is obtained,
generating a residual between original EL data and the predicted version of EL data,
selecting for the case of inter coded EL between at least two different inter coding modes, wherein a first inter coding mode comprises using upsampled BL motion information and a second inter coding mode comprises using motion information generated from said EL data,
encoding the transformed and quantized BL data, and
encoding said EL residual using the selected EL encoding mode and an indication indicating said mode to a decoder.

According to one aspect of the invention, the method for encoding further comprises the step of selecting for the case of intra coded EL data between at least two different intra coding modes, wherein at least one but not all of the intra coding modes comprises additional intra coding of said residual between original EL data and the predicted version of EL data.

Advantageously, the two mentioned encoder embodiments can be combined into a combined encoder that can adaptively encode intra- and inter-encoded video data, using means for detecting whether encoded video data are Inter or Intra coded (e.g. according to an indication).

According to one aspect of the invention, a method for decoding scalable video data having a BL and an EL, wherein pixels of the BL have less bit depth than pixels of the enhancement layer, comprises the steps of
receiving quantized and (e.g. DCT-) transformed enhancement layer information and base layer information and a decoding mode indication,
performing inverse quantization and inverse transformation on the received EL and BL information,
upsampling inverse quantized and inverse transformed BL information, wherein the bit depth per value is increased and wherein predicted EL information is obtained, and
reconstructing from the predicted EL information and the inverse quantized and inverse transformed EL information reconstructed EL video information, wherein a decoding mode according to said decoding mode indication is selected, wherein possible decoding modes comprise
a first mode, wherein in the case of inter coded EL information the inverse quantized and inverse transformed EL information is decoded using motion information extracted from the EL information, and
a second mode, wherein in the case of inter coded EL information the inverse quantized and inverse transformed EL information is decoded using motion information extracted from the BL information.

According to one aspect of the invention, the method for decoding is further specified in that possible decoding modes further comprise
a third mode, wherein in the case of intra coded EL information the inverse quantized and inverse transformed EL information results in an EL residual, and
a fourth mode, wherein in the case of intra coded EL information the inverse quantized and inverse transformed EL information is intra decoded (using I_NxN decoding) to obtain said EL residual.

Advantageously, the two mentioned decoder embodiments can be combined into a combined decoder that can adaptively decode intra- and inter-encoded video data.

According to another aspect of the invention, an encoded scalable video signal comprises encoded EL data, encoded EL data and a prediction type indication, wherein the encoded EL data comprises a residual being the difference between a bit depth upsampled BL image and an EL image, the residual comprising differential bit depth information, and wherein the prediction type indication indicates whether or not the decoder must perform spatial intra decoding on the EL data to re-obtain the residual that refers to said bit depth upsampled BL image.

According to another aspect of the invention, an apparatus for encoding video data having a base layer and an enhancement layer, wherein the base layer has lower color resolution and lower spatial resolution than the enhancement layer, comprises means for transforming and means for quantizing base layer data,
means for inverse transforming and means for inverse quantizing the transformed and quantized base layer data, wherein reconstructed base layer data are obtained,
means for upsampling the reconstructed base layer data, wherein the upsampling refers at least to bit depth and wherein a predicted version of enhancement layer data is obtained, means for generating a residual between original enhancement layer data and the predicted version of enhancement layer data, means for selecting for the case of inter coded enhancement layer between at least two different inter coding modes, wherein a first inter coding mode comprises using upsampled base layer motion information and a second inter coding mode comprises using motion information generated from said enhancement layer data, means for encoding the transformed and quantized base layer data, and means for encoding said enhancement layer residual using the selected enhancement layer encoding mode.

According to another aspect of the invention, an apparatus for decoding video data having a BL and an EL, wherein the BL has lower color resolution and lower spatial resolution than the EL, comprises means for transforming and means for quantizing BL data, means for inverse transforming and means for inverse quantizing the transformed and quantized BL data, wherein reconstructed BL data are obtained, means for upsampling the reconstructed BL data, wherein the upsampling refers at least to bit depth and wherein a predicted version of EL data is obtained, means for generating a residual between original EL data and the predicted version of EL data, means for selecting for the case of inter coded EL between at least two different inter coding modes, wherein a first inter coding mode comprises using upsampled BL motion information and a second inter coding mode comprises using motion information generated from said EL data, means for encoding the transformed and quantized BL data, and means for encoding said EL residual using the selected EL encoding mode.

Various embodiments of the presented coding solution are compatible to H.264/AVC and all kinds of scalability that are currently defined in H.264/AVC scalable extension (SVC).

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 a framework of color bit depth scalable coding;

FIG. 2 an encoder framework of a new Intra coding mode for bit depth scalable enhancement layer;

FIG. 3 an encoder framework of two new Inter coding modes for bit depth scalable enhancement layer;

FIG. 4 a decoder framework of two new Inter coding modes for bit depth scalable enhancement layer; and FIG. 5 a decoder framework of the new Intra coding mode for bit depth scalable enhancement layer.

DETAILED DESCRIPTION OF THE INVENTION

Figure 1:
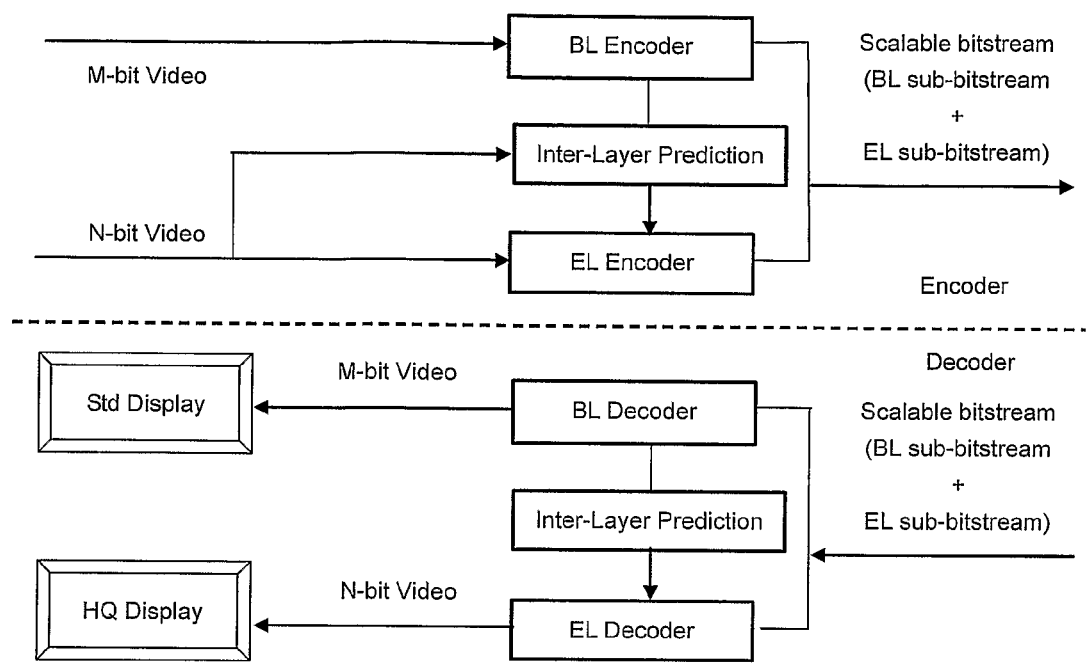

As shown in FIG. 1, two videos are used as input to the video encoder: N-bit raw video and M-bit (M<N, usually M=8) video. The M-bit video can be either decomposed from the N-bit raw video or given by other ways. The scalable solution can reduce the redundancy between two layers by using pictures of the BL. The two video streams, one with 8-bit color and the other with N-bit color (N>8), are input to the encoder, and the output is a scalable bit-stream. It is also possible that only one N-bit color data stream is input, from which an M-bit (M<N) color data stream is internally generated for the BL. The M-bit video is encoded as the BL using the included H.264/AVC encoder. The information of the BL can be used to improve the coding efficiency of the EL. This is called inter-layer prediction herein. Each picture—a group of MBs—has two access units, one for the BL and the other one for the EL. The coded bitstreams are multiplexed to form a scalable bitstream. The BL encoder comprises e.g. an H.264/AVC encoder, and the reconstruction is used to predict the N-bit color video, which will be used for the EL encoding.

As shown in FIG. 1, the scalable bit-stream exemplarily contains an AVC compliant BL bit-stream, which can be decoded by a BL decoder (conventional AVC decoder). Then the same prediction as in the encoder will be done at the decoder side (after evaluation of a respective indication) to get the predicted N-bit video. With the N-bit predicted video, the EL decoder will then use the N-bit prediction to generate the final N-bit video for a High Quality display HQ.

In the following, when the term color bit depth is used it means bit depth, i.e. the number of bits per value. This is usually corresponding to color intensity.

In one embodiment, the present invention is based on the current structure of SVC spatial, temporal and quality scalability, and is enhanced by bit depth scalability for enhanced color bit depth. Hence, this embodiment is completely compatible to the current SVC standard. However, it will be easy for the skilled person to adapt it to other standards.

In one embodiment of the invention three new types of encoding mode can be used, which are all based on bit depth prediction for bit depth scalability. These new coding modes were designed to solve the problem of how to more efficiently and more flexibly encode the inter-layer residual. Current SVC standard only supports encoding the inter-layer residual at I_BL mode, without any prediction mode selection. For Inter coding, the current SVC standard does not support directly encoding the inter-layer residual. Instead, residual inter-layer prediction is done for encoding the difference between the BL residual and the EL residual. In other words, the input to the inter-layer prediction module is the residual of BL in Inter coding, but not the reconstructed BL that is used herein. From the disclosed three new coding modes, one refers to Intra coding and the other two to Inter coding, for encoding the inter-layer residual based on H.264/AVC.

Intra Coding Mode

The current SVC standard supports two types of coding modes for enhancement layer Intra MB, one is original H.264/AVC I_N×N coding mode, and the other one is an SVC special coding mode I_BL. In current SVC, I_N×N mode encodes the original EL N-bits video while I_BL mode codes the inter-layer residual directly without prediction mode selection. The present invention adds a new mode for coding Intra MBs, by treating the inter-layer residual as N-bit video and replacing the original N-bit video with the inter-layer residual. With the presented new Intra mode, the Intra MB best mode is selected between I_BL mode and I_N×N encoded version of the N-bit inter-layer residual. A framework of Intra coding for a color bit depth scalable codec with this Intra coding mode is shown in FIG. 2.

Depending on a mode selection switch MSS, the EL residual is or is not I_N×N encoded before it is transformed T, quantized Q and entropy coded $EC_{EL}$. The encoder has means for deciding the encoding mode based on RDO, which provides a control signal EL_intra_flag that is also output for correspondingly controlling the decoder. For this purpose the means for deciding can actually perform the encoding, or only analyze the input image data according to defined parameter, e.g. color or texture smoothness.

A corresponding decoder is shown in FIG. 5. It detects in its input data an indication EL_intra_flag, and in response to the indication sets MCC' the corresponding decoding mode in its EL branch. For one value of the indication EL_intra_flag the inverse quantized and inverse transformed EL residual EL'$_{res}$ will be used as it is for decoding, while for another value of the indication EL_intra_flag spatial prediction I_N×N will be performed before. The indication can be contained e.g. in slice header information and be valid for a complete slice.

Inter Coding Mode

For Inter coding, the current SVC standard does not support the inter-layer prediction using the reconstructed base layer picture, but supports the inter-layer prediction based on the base layer residual, that is the difference between the original BL M-bit video and the reconstructed M-bit counterpart generated by the BL encoder. By utilizing the new Inter coding mode for the EL, the inter-layer prediction is done using the reconstructed and upsampled M-bit BL information $Pre_c\{BL_{rec}\}$, as shown in FIG. 3. In the EL branch of the encoder, this inter-layer residual is encoded using one of the at least two encoding modes.

The first new EL Inter coding mode comprises encoding the inter-layer residual MB instead of encoding the EL original N-bit MB, with the motion vectors $MV_{EL}$ obtained by motion estimation (ME) from the EL data, and in particular from the current and previous EL residuals.

In the second EL Inter coding mode, the motion vectors for the EL are shared from the BL. ME and motion compensation (MC) are computationally complex, therefore this encoding method saves much processing power in the EL encoder. By sharing the BL motion vectors, both the running time of the encoder and the generated bitrate can be reduced. The BL motion data are upsampled $MV_{BLUp}$ and are used for the BL MC MCPred in this mode.

A flag base_mode_flag is the switch between the two new EL Inter coding modes, which flag is also output together with the encoded BL and EL data for correspondingly controlling the decoder.

A corresponding decoder is shown in FIG. 4. In the particular embodiment of FIG. 4 the BL residual is in addition spatially upsampled, using residual upsampling RUp before it is bit depth upsampled BDUp. A flag base_mode_flag is detected in the incoming data stream and used to control the decoding mode: if the flag has a first value, motion information extracted from the incoming EL data stream $EL_{MI}$ is used for the EL branch. If the flag has another second value, upsampled MUp motion information from the BL, which was extracted from the incoming data EL stream and then upsampled, is used for the EL branch. Other parts (image data) of the incoming BL data stream are inverse quantized and inverse transformed and the resulting residual $BL_{res,k}$ is used to construct the BL video (if required) and for upsampling (if EL video is required). In principle it is sufficient if the scalable decoder generates either BL video or EL video, depending on the requirements defined by a user.

Two main advantages of the presented new coding modes of EL for color bit depth scalable coding are: first, the new coding modes provide more mode options for the encoder, which is especially useful for RDO, since RDO has more choices then, and better optimization is possible. Secondly, with these new modes the inter-layer residual is encoded directly, and higher coding efficiency is achieved.

Thus, the invention can be used for scalable encoders, scalable decoders and scalable signals, particularly for video signals or other types of signals that have different quality layers and high inter-layer redundancy.

It will be understood that the present invention has been described purely by way of example, and modifications of detail can be made without departing from the scope of the invention. Each feature disclosed in the description and (where appropriate) the claims and drawings may be provided independently or in any appropriate combination. Features may (where appropriate) be implemented in hardware, software, or a combination of the two. Reference numerals appearing in the claims are by way of illustration only and shall have no limiting effect on the scope of the claims.

The invention claimed is:

1. Method for encoding video data having a base layer and an enhancement layer, wherein the base layer has lower color resolution than the enhancement layer, the method comprising the steps of:

transforming and quantizing base layer data;

inverse transforming and inverse quantizing the transformed and quantized base layer data, wherein reconstructed base layer data are obtained;

upsampling the reconstructed base layer data, wherein the upsampling refers at least to bit depth and wherein a predicted version of the enhancement layer is obtained;

generating a residual between an original enhancement layer and the predicted version of the enhancement layer;

selecting for a case of an inter coded enhancement layer macroblock between at least two different inter coding modes and for a case of an intra coded enhancement layer macroblock between at least two different intra coding modes, wherein a first inter coding mode of the at least two different inter coding modes comprises using upsampled base layer motion information and a second inter coding mode of the at least two different inter coding modes comprises using motion information generated from said residual, and wherein at least one but not all of the intra coding modes comprises an additional step of intra coding of said residual using an Intra mode in which prediction from said residual is employed;

encoding the transformed and quantized base layer data;

encoding said residual using the selected mode and encoding an indication indicating said selected mode, wherein the encoding comprises a transform and a quantization step; and performing entropy coding on the encoded enhancement layer residual and said indication.

2. Method according to claim 1, wherein the steps of selecting between different coding modes comprise a step of rate-distortion-optimization.

3. Method according to claim 1, wherein the step of upsampling also comprises spatial upsampling.

4. Method for decoding scalable video data having a base layer and an enhancement layer, wherein the base layer has less bit depth than the enhancement layer, comprising the steps of:

performing entropy decoding to obtain quantized and transformed enhancement layer information and base layer information and a decoding mode indication;

performing inverse quantization and inverse transformation on the base layer information and on the obtained quantized and transformed enhancement layer information to obtain a residual between a predicted enhancement layer and an original enhancement layer;

upsampling inverse quantized and inverse transformed base layer information, wherein a bit depth per value is increased and wherein the predicted enhancement layer is obtained; and reconstructing, from the predicted enhancement layer and the inverse quantized and inverse transformed enhancement layer information, reconstructed enhancement layer video information, wherein a decoding mode on a macroblock level according to said decoding mode indication is selected from a first mode, wherein in a case of inter coded enhancement layer information the inverse quantized and inverse transformed enhancement layer information is decoded using motion information that is generated from the residual and extracted from the enhancement layer information;

a second mode, wherein in the case of inter coded enhancement layer information the inverse quantized and inverse transformed enhancement layer information is decoded using motion information that is extracted from the base layer information and then upsampled;

a third mode, wherein in a case of intra coded enhancement layer information prediction from said base layer is employed; and a fourth mode, wherein in the case of intra coded enhancement layer information the inverse quantized and inverse transformed enhancement layer information is intra decoded using an Intra mode in which prediction from said residual is employed.

5. Method according to claim 4, wherein a reconstructed enhancement layer residual is obtained, further comprising the step of adding the reconstructed enhancement layer residual to reconstructed, motion compensated enhancement layer information.

6. Method according to claim 1, wherein in the second inter coding mode, the motion information generated from said residual is generated from a current enhancement layer residual and at least one previous enhancement layer residual.

* * * * *